(12) United States Patent
Stradella

(10) Patent No.: US 10,196,116 B2
(45) Date of Patent: Feb. 5, 2019

(54) CONNECTION SYSTEM COMPRISING A CLOSING DEVICE FOR DIVING REGULATOR

(71) Applicant: R.G. s.a.s. DI ROSARIA GALLI & CO, Camogli (GE) (IT)

(72) Inventor: Fabio Stradella, Camogli (IT)

(73) Assignee: R.G. S.A.S. DI ROSARIA GALLI & CO, Camogli (IT)

( * ) Notice: Subject to any disclaimer, the term of this patent is extended or adjusted under 35 U.S.C. 154(b) by 0 days.

(21) Appl. No.: 15/511,528

(22) PCT Filed: Sep. 15, 2015

(86) PCT No.: PCT/EP2015/071096
§ 371 (c)(1),
(2) Date: Mar. 15, 2017

(87) PCT Pub. No.: WO2016/041960
PCT Pub. Date: Mar. 24, 2016

(65) Prior Publication Data
US 2017/0259895 A1    Sep. 14, 2017

(30) Foreign Application Priority Data

Sep. 16, 2014  (FR) ...................................... 14 58752

(51) Int. Cl.
*B63C 11/22* (2006.01)
*F16K 15/14* (2006.01)
(Continued)

(52) U.S. Cl.
CPC ........ *B63C 11/2209* (2013.01); *F16K 15/145* (2013.01); *G05D 16/00* (2013.01); *G05D 16/0647* (2013.01); *Y10T 137/7896* (2015.04)

(58) Field of Classification Search
CPC ............ B63C 11/2209; G05D 16/0647; F16K 15/145; Y10T 137/7896
See application file for complete search history.

(56) References Cited

U.S. PATENT DOCUMENTS 2,746,477 A    5/1956  Krause et al.
3,495,607 A *  2/1970  Shugarman ......... B63C 11/2209
                                                  137/505.18
(Continued)

FOREIGN PATENT DOCUMENTS

DE    10 2009 049245 A1    5/2010
EP         1 334 904 A1    8/2003

OTHER PUBLICATIONS

International Search Report for PCT/EP2015/071096 dated Feb. 10, 2016.
International Preliminary Report on Patentability with Written Opinion dated Mar. 30, 2017, issued by the International Searching Authority in application No. PCT/EP2015/071096.

*Primary Examiner* — Craig Schneider
*Assistant Examiner* — Kevin Barss
(74) *Attorney, Agent, or Firm* — Sughrue Mion, PLLC

(57) ABSTRACT

A connection system, in particular for a pressure reducer of a diving regulator, the system comprising a connector (1) having a first end (2) adapted to be fastened to a pressure reducer and a second end (2') adapted to be fastened to a valve of a compressed air cylinder, said connector (1) having an internal passage (4) extending substantially axially between said first and second ends, said internal passage (4) including a filter (5), preferably made of sintered stainless steel, and a retaining member (6a; 6b; 6c; 6c'; 6d; 6e) fastened to said second end (2') and supporting firstly said filter (5) and secondly a main O-ring (7; 9e), said retaining member (6a; 6b; 6c; 6c'; 6d; 6e) forming an inlet opening, said system including a shutter device comprising a shutter member (9a; 9b; 9c: 9c'; 9d; 9e) that is deformable and/or movable between a shut position in which it shuts said inlet (Continued)

opening, and an open position in which it does not shut said inlet opening, said shutter member (9a; 9b; 9c: 9c'; 9d; 9e) being urged resiliently towards its shut position and being deformed and/or shifted towards its open position by compressed air coming from said compressed air cylinder, said shutter member (9a; 9b; 9c: 9c'; 9d; 9e) being deformed and/or shifted towards its open position in a direction extending substantially transversely relative to the flow direction of the compressed air stream.

17 Claims, 7 Drawing Sheets

(51) Int. Cl.
    *G05D 16/06*     (2006.01)
    *G05D 16/00*     (2006.01)

(56) References Cited

U.S. PATENT DOCUMENTS

| | | | |
|---|---|---|---|
| 5,497,803 A * | 3/1996 | Ferrante | A62B 9/02 137/505.42 |
| 5,746,198 A * | 5/1998 | Taba | A62B 9/02 128/204.26 |
| 7,261,107 B2 * | 8/2007 | Peyron | B63C 11/2209 128/204.26 |
| 7,341,075 B2 * | 3/2008 | Taylor | B63C 11/2209 128/205.22 |
| 2002/0179153 A1 * | 12/2002 | Taylor | A62B 9/02 137/540 |
| 2004/0168688 A1 | 9/2004 | Peyron | |

* cited by examiner

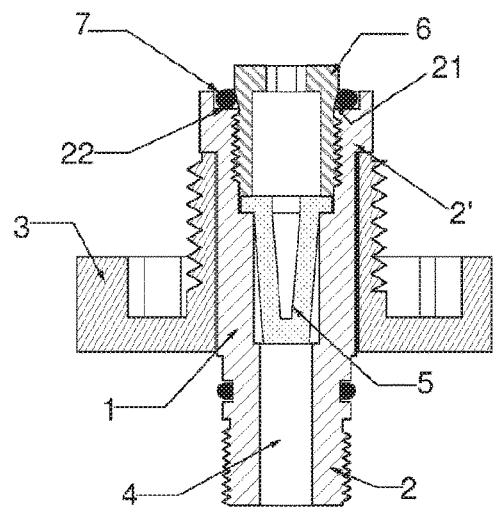
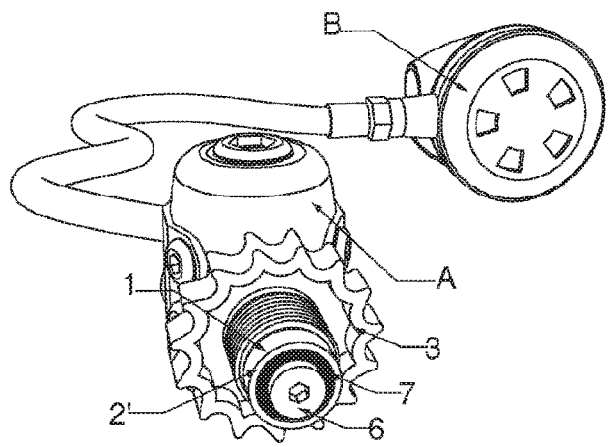
FIG. 1
FIG. 1a
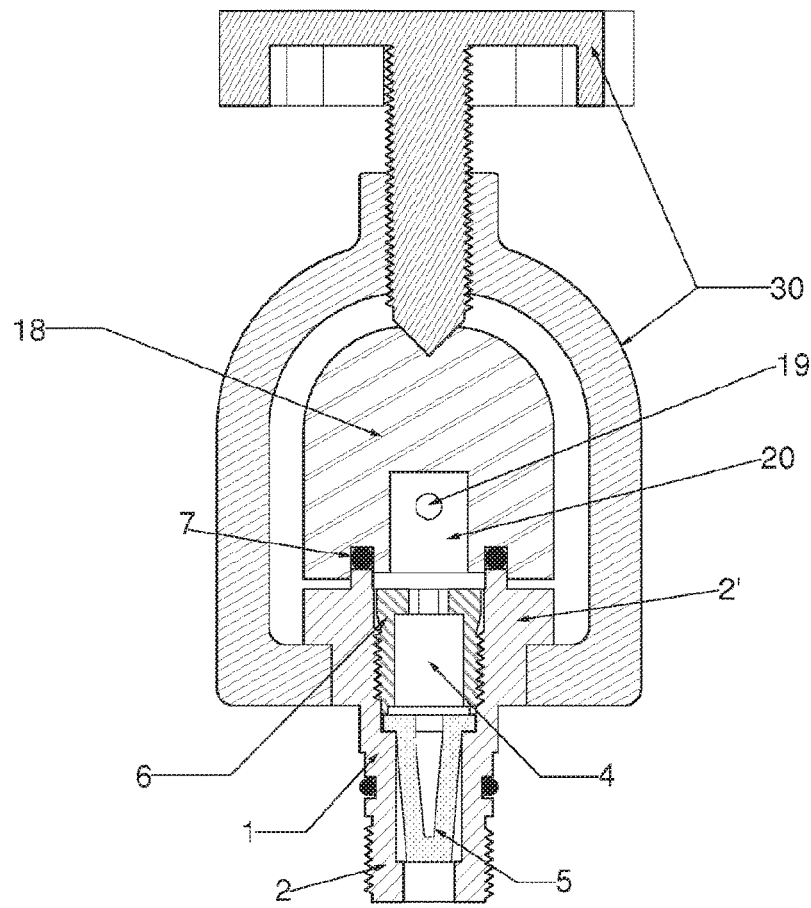
FIG. 2

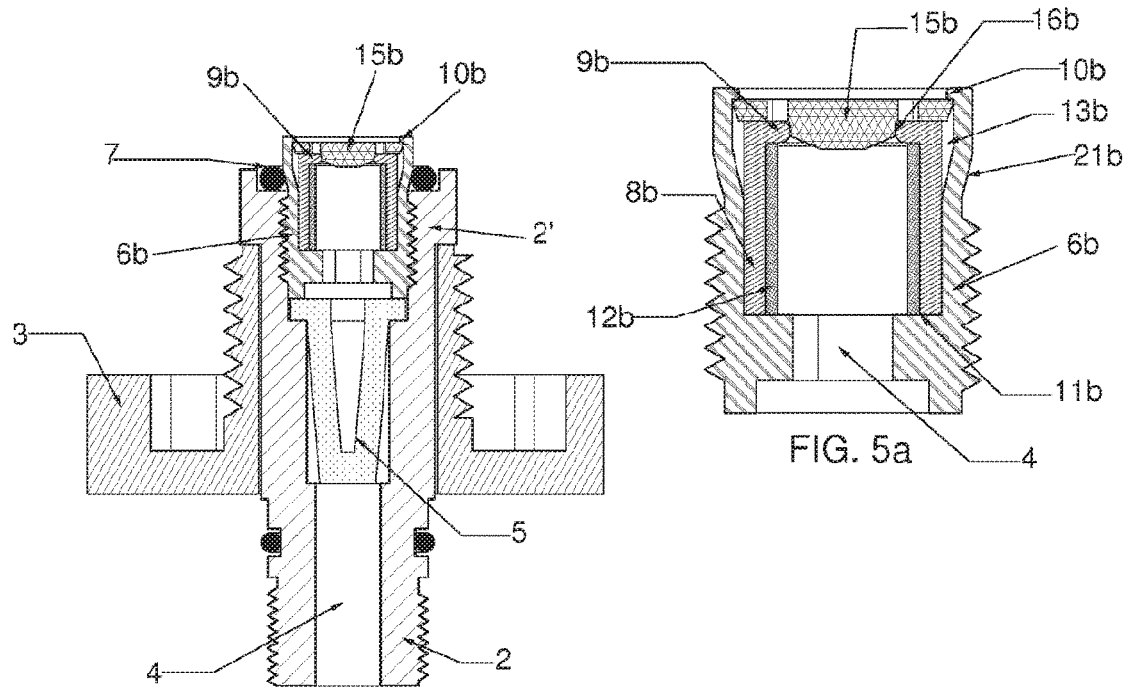
FIG. 5
FIG. 5a
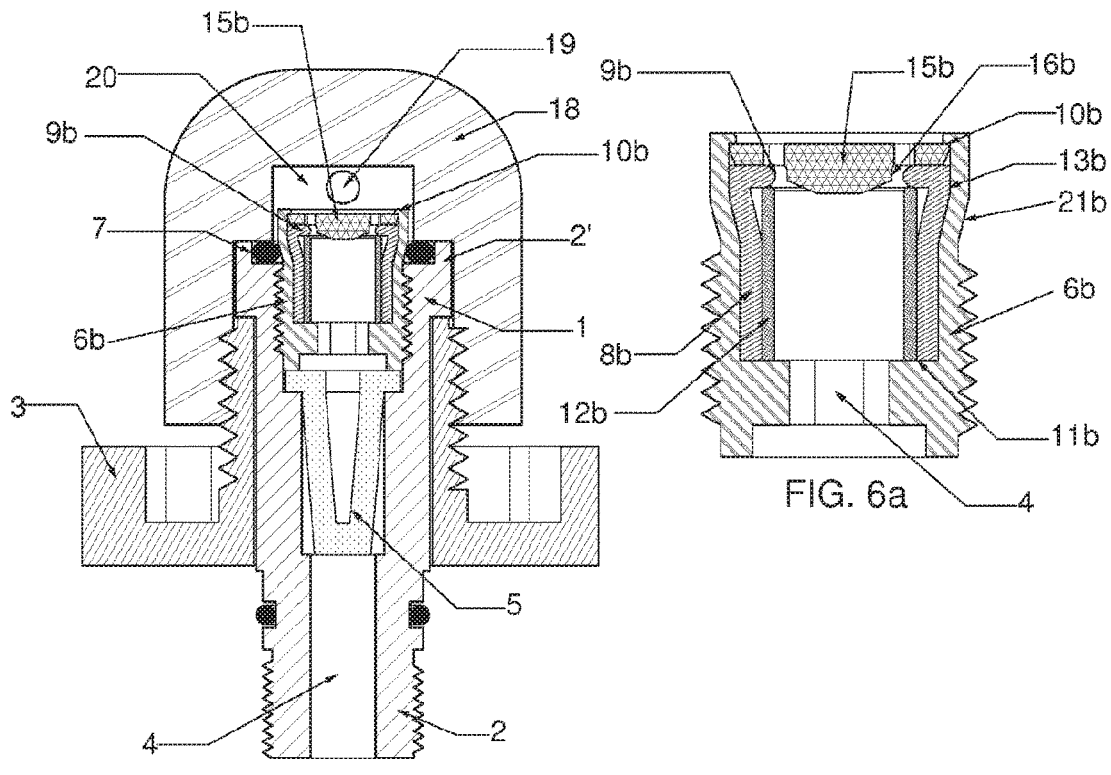
FIG. 6
FIG. 6a

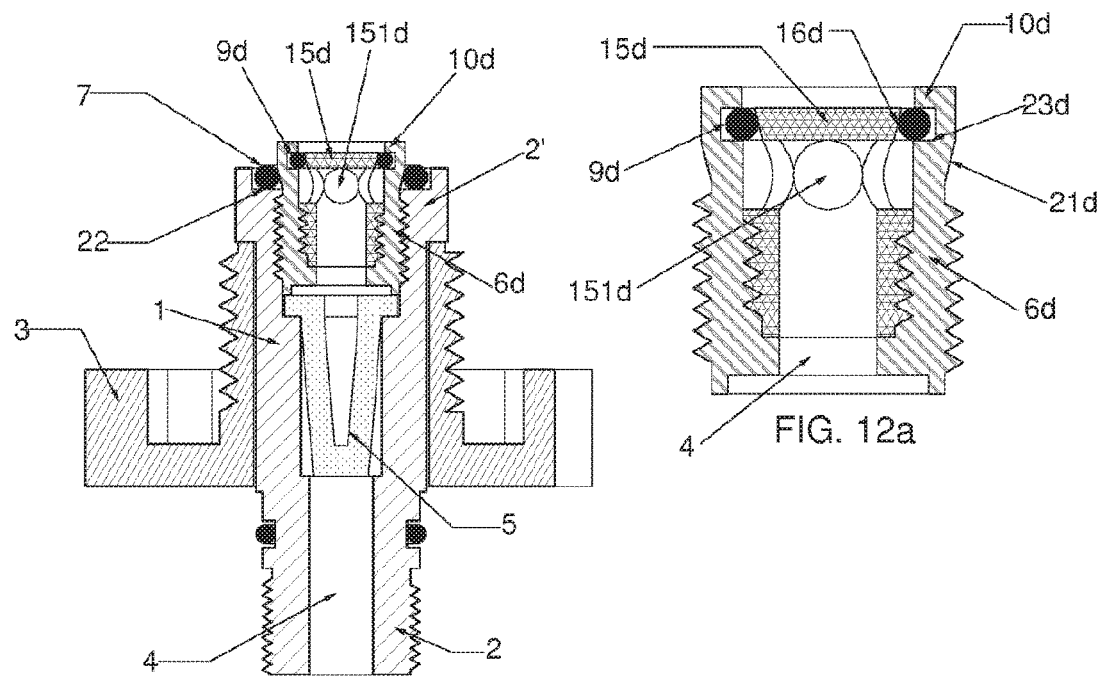
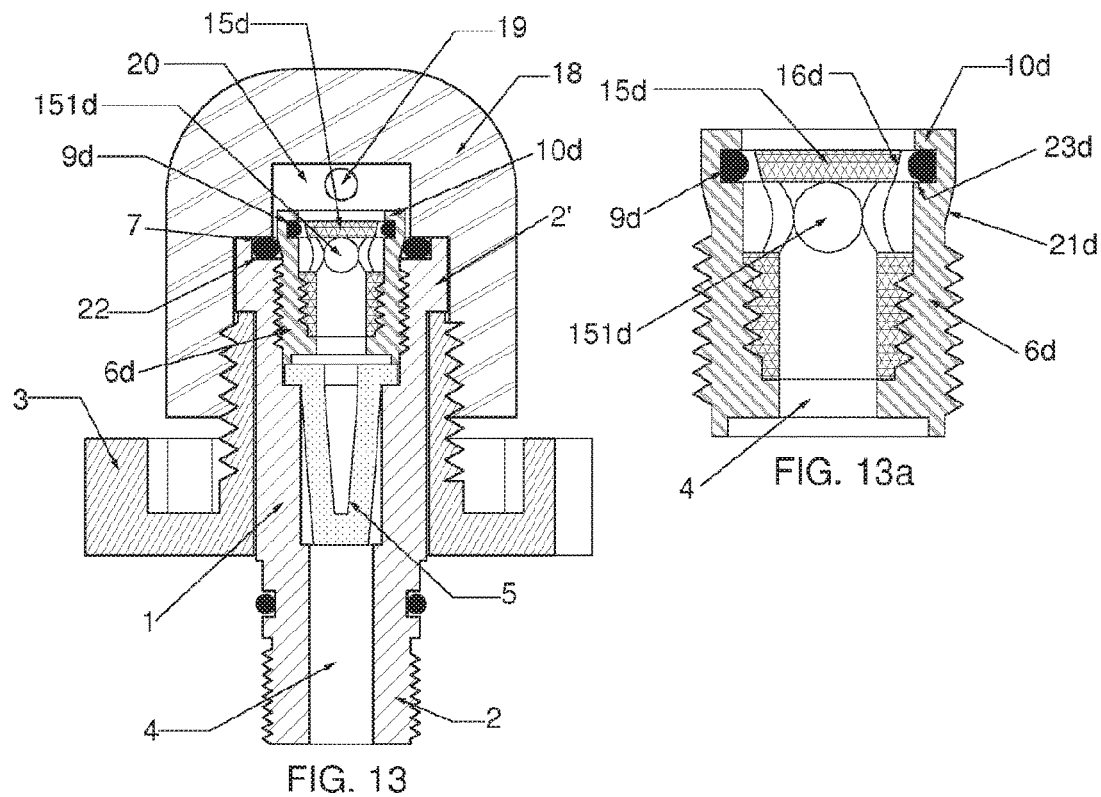

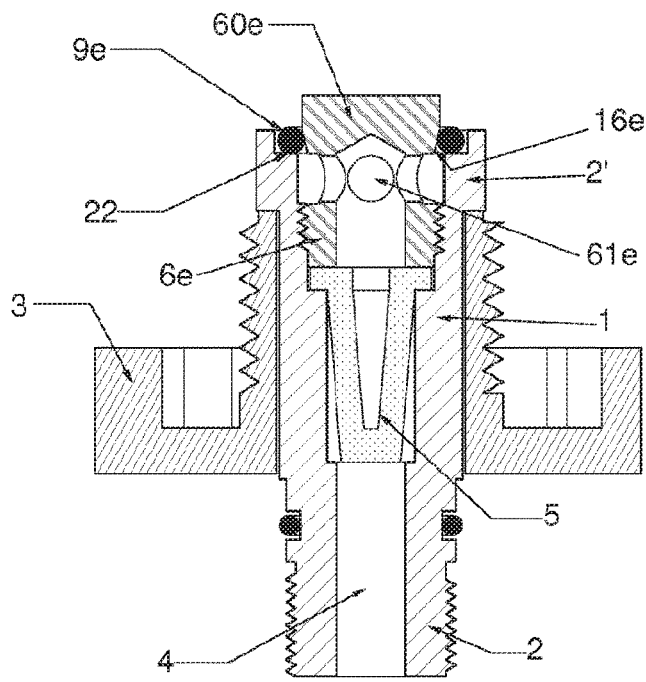
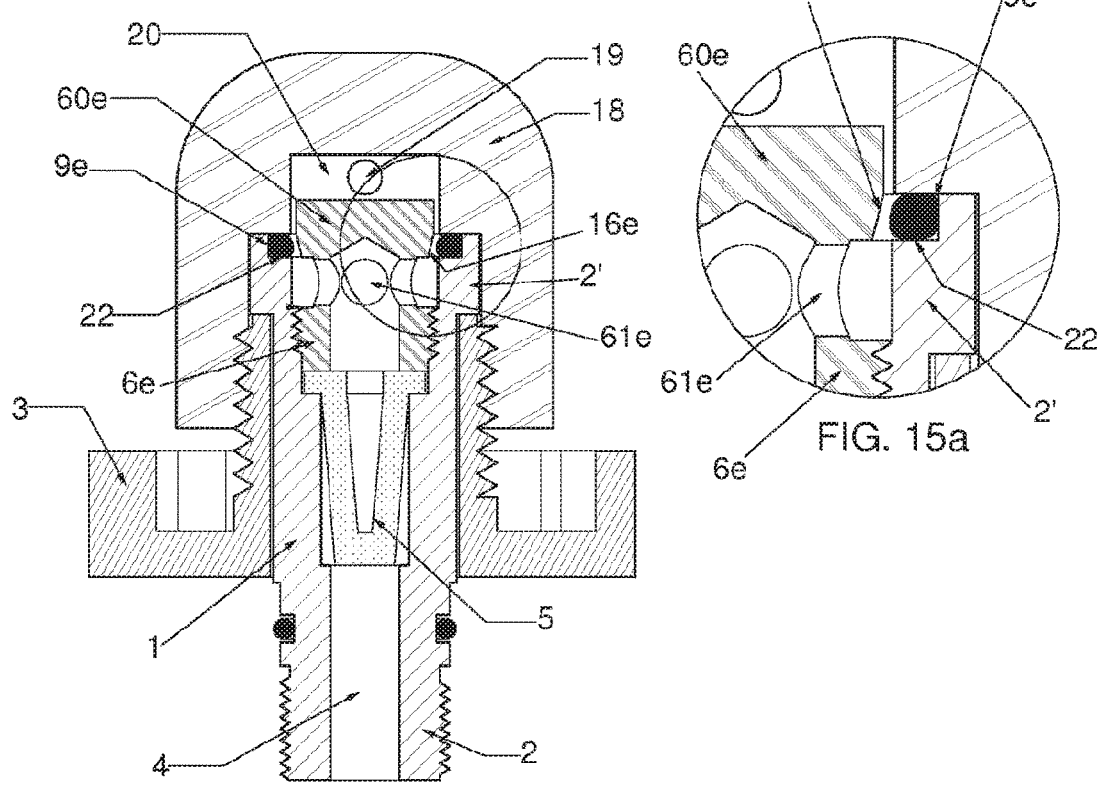
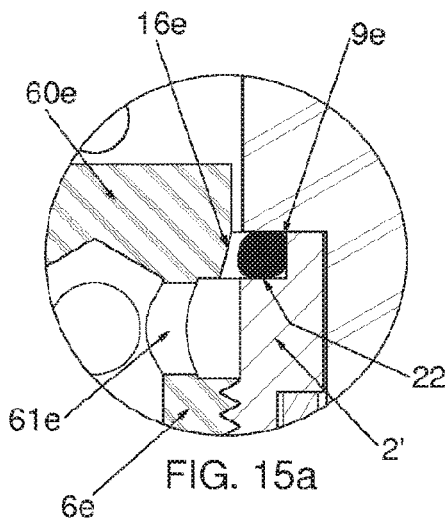

CONNECTION SYSTEM COMPRISING A CLOSING DEVICE FOR DIVING REGULATOR

CROSS REFERENCE TO RELATED APPLICATIONS

This application is a National Stage of International Application No. PCT/EP2015/071096 filed Sep. 15, 2015, claiming priority based on French Patent Application No. 1458752 filed Sep. 16, 2014, the contents of all of which are incorporated herein by reference in their entirety.

The present invention relates to a connection system including a shutter device, in particular for a pressure reducer, in particular a pressure reducer of a diving regulator.

A diving regulator includes a pressure reducer that is fastened to a compressed air tank, usually referred to as a "cylinder", and connected by means of a hose to an on-demand valve having an interface, such as a mouthpiece, for enabling the user to breathe air from the regulator. The pressure reducer is commonly referred to as the "first stage", while the on-demand valve is generally referred to as the "second" stage. When the pressure reducer is not connected to a valve of a cylinder, its air inlet is open to the outside environment, and if the pressure reducer is immersed in water, water can penetrate therein. This situation, which can often arise (e.g. in a boat where there is always some water in the bottom), can lead to severe problems since water, and in particular sea water, can lead to oxidation and to deposits of salt that can block or plug the internal portions and ducts of the pressure reducer. That has lead to a strong demand for a system capable of passing the compressed air needed for breathing, while simultaneously avoiding ingress of water when the pressure reducer is not fastened to a valve of a cylinder and is immersed in water, such as the water that might be found in the bottom of a boat, for example.

Examples of the state of the art are described in particular in the following documents: JPH08198181, U.S. Pat. No. 7,912,871, US 2004/079419, US 2007/144592, US 2008/149103, and US 2006/157123.

The devices described above are based essentially on two concepts.

A first concept has no sealing element, the element being replaced by a porous barrier that can be constituted by a disk made of a foam material having open microcells or of a membrane provided with microslots or pinholes. In other words, a barrier provided with narrow passages having the function of allowing compressed air to pass through while stopping water, which barrier is based essentially on the differences in density and on the effectivenesses with which compressed air and non-compressed water can penetrate the barrier. The device is always open, and no provision is made for any operation to physically open the apparatus. Those devices are not applicable to breathing apparatuses, in particular those that are exposed to salt water. This is because the narrow passages would form unacceptable limitations on the air flow capacity of the regulator, and because the narrow passages can easily become obstructed and/or blocked by inevitable deposits of salt. It should be observed that using that type of device would be potentially very dangerous since in the event of the narrow passages becoming clogged or blocked, e.g. by deposits of salt, and/or in the event of a sudden opening of the valve of the cylinder (pressure rising quickly up to 300 bars), and/or in the event of a demand for a large quantity of air (hard work in deep water), the flow rate of air that is required can often be greater than the flow capacity of the porous barrier. One consequence could be breakage of the porous barrier, with a risk of one or more portions detached from said porous barrier blocking the air stream to the user, with potentially lethal consequences.

A second concept makes provision for using a sealing element, generally constituted by a shutter element held in its shut position by a return element, such as a spring. This second concept can be used in two different applications:

a first application using as its sealing element a lid placed on the outside of the air inlet duct of the pressure reducer, and urged by a spring to cover and shut the inlet orifice in the air flow direction. Opening it requires the lid to be moved manually or mechanically, and this is not done by compressed air but can be achieved automatically when connecting the pressure reducer to the valve of the compressed air cylinder. That solution is very complex and expensive and exposes several moving parts that move relative to one another to salt water and to deposits of salt, with a clear risk of malfunction, in particular during the stage of returning to the shut position; and a second solution using as its sealing element a plug in the form of a piston sliding inside the air inlet duct of the pressure reducer, and urged by a spring to plug and shut the inlet orifice in the direction opposite to the flow of air. Opening is provided by the action of the compressed air and it is achieved by the sealing element (piston/plug) moving axially in the air flow duct. That solution is likewise complex and expensive, and can also give rise to problems because of exposure to deposits of salt and to salt water. Because of the close mechanical relationship between the piston/plug, the spring, and the duct, this can lead to large amounts of friction and to movements between these parts being limited. Furthermore, the presence in the air inlet duct of the piston/plug and of the spring puts limits on the flow and generates turbulence in the stream of compressed air, which can affect the performance of the regulator.

An object of the present invention is to provide a connection system including a shutter device for a pressure reducer, and in particular for a diving regulator, that does not reproduce the above-mentioned drawbacks.

A particular object of the present invention is to provide such a system that operates reliably under all conditions of use.

Another object of the present invention is to provide such a system that is capable of delivering air at a high flow rate, in compliance with the demand for performance in the undersea diving industry.

Another object of the present invention is to provide such a system in which the opening and shutting movements are affected little or not at all by salt water.

Another object of the present invention is to provide such a system that is simple and inexpensive to fabricate and to assemble.

The present invention thus provides a connection system, in particular for a pressure reducer of a diving regulator, the system comprising a connector having a first end adapted to be fastened to a pressure reducer and a second end adapted to be fastened to a valve of a compressed air cylinder, said connector having an internal passage extending substantially axially between said first and second ends, said internal passage including a filter, preferably made of sintered stainless steel, and a retaining member fastened to said second end and supporting firstly said filter and secondly a main O-ring, said retaining member forming an inlet opening, said system including a shutter device comprising a shutter member that is deformable and/or movable between a shut position in which it shuts said inlet opening, and an open position in which it does not shut said inlet opening, said shutter member being urged resiliently towards its shut position and being deformed and/or shifted towards its open position by compressed air coming from said compressed air cylinder, said shutter member being deformed and/or shifted towards its open position in a direction extending substantially transversely relative to the flow direction of the compressed air stream.

Advantageously, said shutter member is made of an elastically deformable material such as an elastomer.

Advantageously, said shutter member, when in the open position, is arranged outside said internal passage so that it does not limit the flow of the compressed air stream.

In a first advantageous variant, said shutter member is arranged inside said retaining member.

Advantageously, said shutter member, when in the shut position, co-operates with a stationary shutter element fastened inside said retaining member.

Advantageously, said stationary shutter element does not extend axially towards the inside of said internal passage beyond said shutter member.

In a variant, said shutter element extends axially towards the inside of said internal passage beyond said shutter member.

Advantageously, said shutter member includes a stationary portion that is stationary relative to said retaining member.

In a second advantageous variant, said shutter member is arranged outside said retaining member.

Advantageously, said shutter member forms said main O-ring of said system.

Advantageously, said shutter member, in the shut position, co-operates directly with said retaining member.

Advantageously, said connector includes a threaded ring for fastening said second end to a threaded outlet from said valve of the compressed air cylinder.

Advantageously, said connector includes a clamp system for fastening said second end to a non-threaded outlet of said valve of the compressed air cylinder.

The present invention also provides a pressure reducer including a connection system as described above.

The present invention also provides a compressed air cylinder valve including a connection system as described above.

The present invention also provides a diving regulator including a pressure reducer or a valve as described above.

These advantages and characteristics of the present invention, and others, appear more clearly from the following detailed description made with reference to the accompanying drawings, that are given as non-limiting examples, and in which:

FIG. 1 is a diagrammatic section view of a conventional connection system for a pressure reducer, not including a shutter device;

FIG. 1a is a perspective view of a regulator including a pressure reducer and the conventional connection system of FIG. 1;

FIG. 2 is a view similar to the view of FIG. 1 showing another conventional connection system for a pressure reducer, without a shutter device;

FIG. 5 is a view similar to the view of FIG. 1, with a shutter device in a second embodiment of the present invention, in the shut position;

FIG. 5a is a fragmentary detail view of the FIG. 5 device;

FIG. 6 is a view similar to the view of FIG. 5, in the open position;

FIG. 6a is a fragmentary detail view of the FIG. 6 device;

FIG. 12 is a view similar to the view of FIG. 1, showing a shutter device in a fourth embodiment of the present invention, in the shut position;

FIG. 12a is a fragmentary detail view of the FIG. 12 device;

FIG. 13 is a view similar to the view of FIG. 12, in the open position;

FIG. 13a is a fragmentary detail view of the FIG. 13 device;

FIG. 14 is a view similar to the view of FIG. 1, with a shutter device in a fifth embodiment of the present invention, in the shut position;

FIG. 15 is a view similar to the view of FIG. 14, in the open position; and

FIG. 15a is a fragmentary detail view of the FIG. 15 device.

Figures 3, 3A:
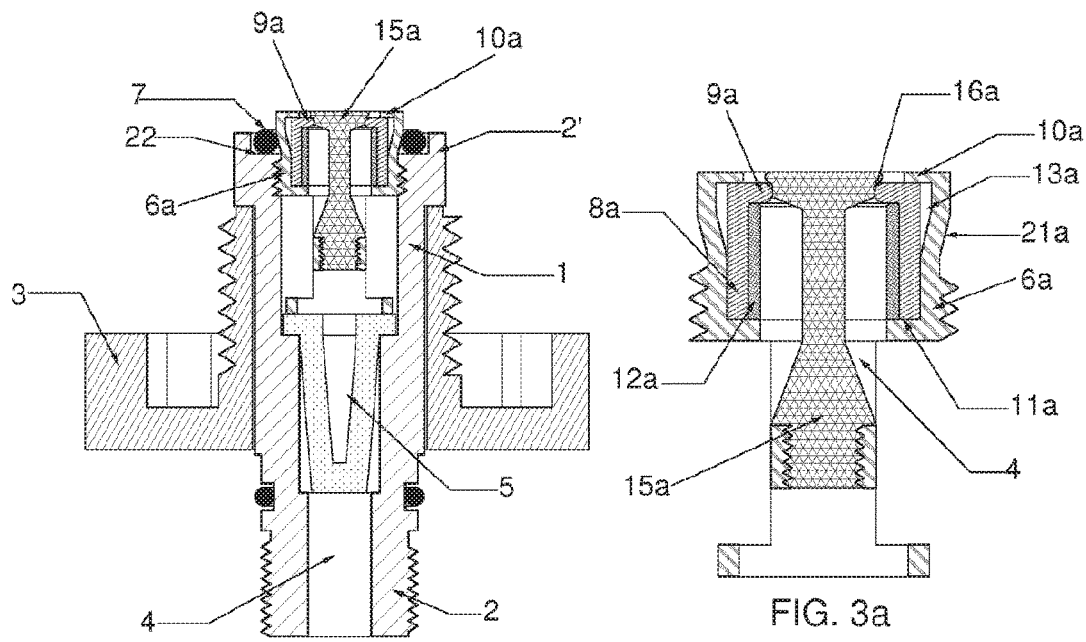
FIG. 3 is a view similar to FIG. 1 showing a shutter device in a first embodiment of the present invention, in the shut position.
FIG. 3a is a fragmentary view of a detail of the FIG. 3 device.

In the description, the terms "axial", "radial", and "transverse" are used relative to the main travel direction of compressed air in the connection system, i.e. the term "axial" corresponds to the vertical direction in the orientation of the figures, while the terms "transverse" and "radial" correspond to a horizontal direction in the orientation of the figures. Likewise, terms such as "top" and "bottom" are relative to the orientation of the figures.

FIGS. 1 and 1a show a first commonly used configuration for a connection system enabling a pressure reducer A or first stage to be connected to a valve of a compressed air cylinder (not shown in the figures), without any means for preventing entry of water. The connection system is made up of a connector 1 fastened via a first end 2 to the pressure reducer A, itself connected via a hose to the on-demand valve, or second stage, arranged in a mouthpiece B. The connection system is provided with a threaded ring 3 for fastening the second end 2' of the connector 1 to the threaded outlet of a valve of a compressed air cylinder.

The connector 1 has an internal passage 4 supporting a filter 5 made of sintered stainless steel, and a threaded retaining member 6 co-operating with said filter 5 and supporting a main O-ring 7. In this configuration, water is free to enter into the pressure reducer in the event of it being immersed, since the connection does not include any shutter means for preventing ingress of water.

FIG. 2 shows another commonly used configuration for a connection system enabling a pressure reducer (not shown in this figure, but similar to the pressure reducer of FIG. 1a), or first stage, to be connected to a valve 18 of a compressed air cylinder, without any means for preventing ingress of water. This second configuration, referred to as a "clamp", differs from the first configuration by the way in which the second end 2' of the connection is fastened to the outlet of the valve 18 of the compressed air cylinder. The threaded ring 3 of FIG. 1 is now replaced by an assembly forming a clamp 30 that enables a non-threaded outlet of the valve 18 of the compressed air cylinder to be fastened to said connector 1.

The present invention is described below with reference to several embodiments relating to the first configuration of FIG. 1, but at least some of these embodiments could also be adapted in corresponding manner to said second configuration with a clamp of FIG. 2. The pressure reducer A and the valve 18 of the compressed air cylinder may be of standard configuration, with only the connection system being modified by the present invention.

Figures 4, 4A:
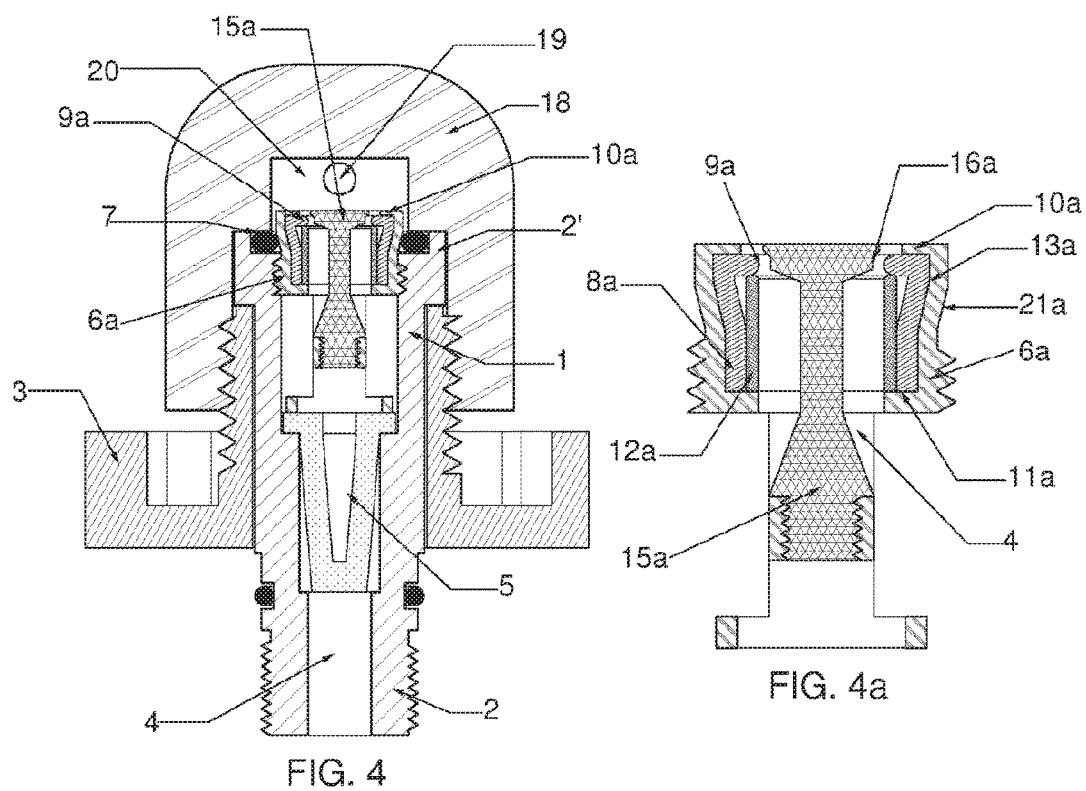
FIG. 4 is a view similar to the view of FIG. 3, in the open position.
FIG. 4a is a fragmentary detail view of the FIG. 4 device.

FIGS. 3 to 4a show a first advantageous embodiment of the invention. The connection system, in particular for a pressure reducer of a diving regulator, comprises a connector 1 having a first end 2 adapted to be fastened to a pressure reducer (not shown), and a second end 2' adapted to be fastened to a valve 18 of a compressed air cylinder. The connector 1 has an internal passage 4 that extends substantially axially between said first and second ends. In conventional manner, said internal passage 4 includes a filter 5, preferably made of sintered stainless steel, and a retaining member 6a fastened to said second end 2' and supporting both said filter 5 and a main O-ring 7. Said retaining member 6a forms an inlet opening and said system includes a shutter device at said inlet opening. The shutter device comprises a shutter member 9a that is deformable and/or shiftable between a shut position in which it shuts said inlet opening, and an open position in which it does not shut said inlet opening, said shutter member 9a being urged resiliently towards its shut position and being deformed and/or shifted towards its open position by compressed air coming from said compressed air cylinder. Some minimum pressure is required to shift said shutter member 9a to its open position in order to avoid any risk of opening when said inlet opening is in a shallow depth of water, typically in the bottom of a boat. Thus, with an opening threshold of about 0.5 bar, it is guaranteed that the shutter device will not open under the effect of such stagnant water.

It should be observed that for reasons of safety in operation of pressure reducers for diving regulators, the shutter device can under no circumstances operate as a one-way check valve, and must on the contrary be capable of allowing air to flow in both directions.

According to the invention, said shutter member 9a is deformed and/or shifted towards its open position in a direction extending substantially transversely relative to the flow direction of the stream of compressed air. Advantageously, said shutter member 9a is made of an elastically deformable material, such as an elastomer.

Advantageously, said shutter member 9a in the open position lies away from said internal passage 4 so that it limits the flow of the stream of compressed air, very little or not at all.

Advantageously, said shutter member 9a is arranged inside said retaining member 6a and, in the closed position, co-operates with a stationary shutter element 15a fastened inside said retaining member 6a.

As can be seen in FIGS. 3a and 4a, the shutter member 9a is held between said retaining member 6a and said stationary shutter member 15a, and advantageously includes a portion 8a that is stationary relative to said retaining member 6a. Advantageously, the shutter member 9a and the stationary portion 8a are made as a single piece of suitable elastomer material.

When compressed air reaches the connector 1, it deforms the shutter member 9a elastically outwards, as shown in FIGS. 4 and 4a, thereby opening said inlet opening. When the compressed air stream stops, said shutter member 9a returns resiliently towards its shut position of FIGS. 3 and 3a.

In this first embodiment, the retaining member 6a forms the support of the shutter device. The shutter member 9a is a radial projection, made of suitable elastomer material, that is secured to a hollow sleeve including said stationary portion 8a. The retaining member 6a is provided with a first retaining shoulder 10a that axially engages the shutter member 9a, and with a second retaining shoulder 11a that axially and transversely engages said stationary portion 8a of the hollow sleeve secured to the shutter member 9a. A rigid retaining sleeve 12a may also be provided inside said hollow sleeve, extending from said second retaining shoulder 11a of said retaining member 6a to said transversely deformable radial projection forming the shutter member 9a.

The retaining member 6a is also provided with a cavity 13a that, in the shut position, surrounds said shutter member 9a.

Said stationary shutter element 15a co-operates via a sealing surface 16a with said shutter member 9a in the shut position.

Closure against penetration of water is provided by leak-tight contact between the shutter member 9a and the sealing surface 16a of the stationary shutter element 15a.

In FIG. 4, the connector 1 is fastened to that outlet of a valve 18 of the compressed air cylinder, provided with a hole 19 and a chamber 20.

When the compressed air stream passing via the hole 19 and the chamber 20 of the valve 18 of the compressed air cylinder comes into contact with the shutter device, it deforms the shutter member 9a transversely or radially outwards, inside the cavity 13a of the retaining member 6a.

It should also be observed that the retaining member 6a has a conical surface 21a of design that is standardized by European standard EN 144-2, and of diameter that is about 1 millimeter (mm) greater than the inside diameter of the main O-ring 7. This conical shape forces the O-ring 7 against the conical surface 21a and against a radial surface 22 of the connector 1, thereby providing natural sealing against water penetrating between the retaining member 6a and the connector 1.

FIGS. 5 to 6a show a second embodiment of the invention, which is a variant of the embodiment of FIGS. 3 to 4a. Only the differences compared with the first embodiment are described below.

In this variant, the stationary shutter element 15b is arranged inside the retaining member 6b and outside the internal passage 4. A shoulder 10b of the retaining member 6b advantageously performs this assembly. This variant is advantageous in that it makes it possible to avoid placing any element, specifically the stationary shutter element 15b, inside the internal passage 4, which might potentially limit the flow rate of the compressed air stream. Otherwise, the second embodiment is similar to the above-described embodiment.

Figures 7, 7A:
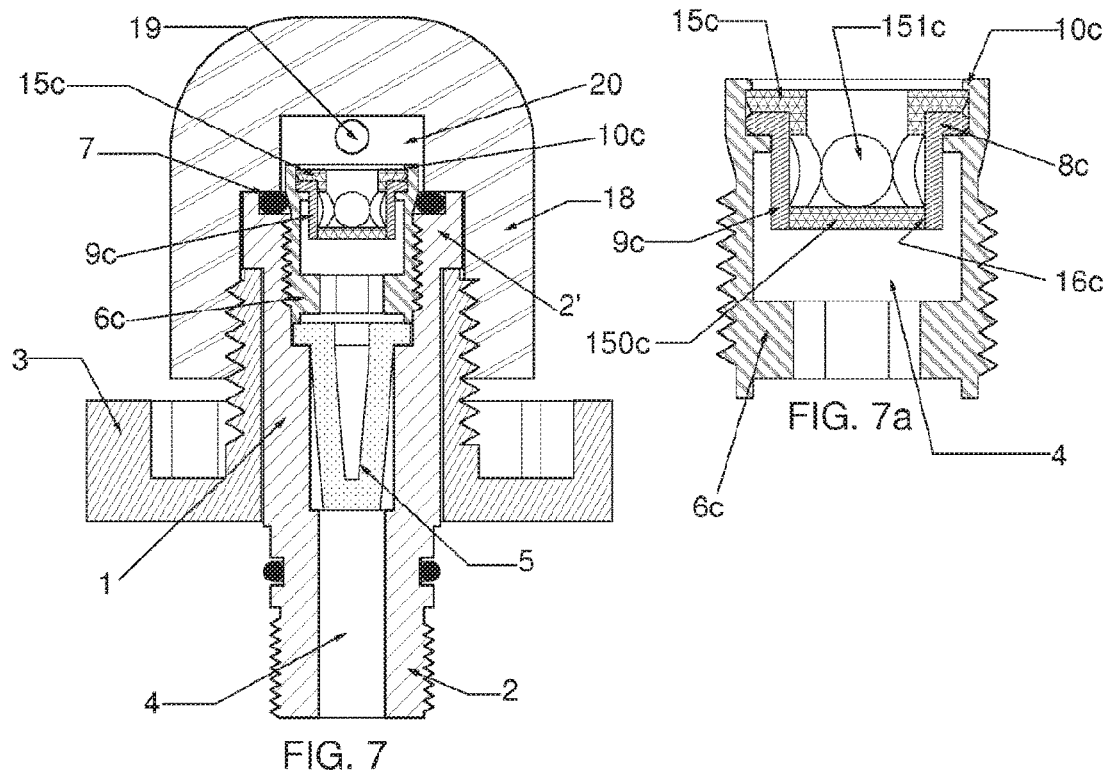
FIG. 7 is a view similar to the view of FIG. 1, with a shutter device in a third embodiment of the present invention, in the shut position.
FIG. 7a is a fragmentary detail view of the FIG. 7 device.
Figures 8, 8A:
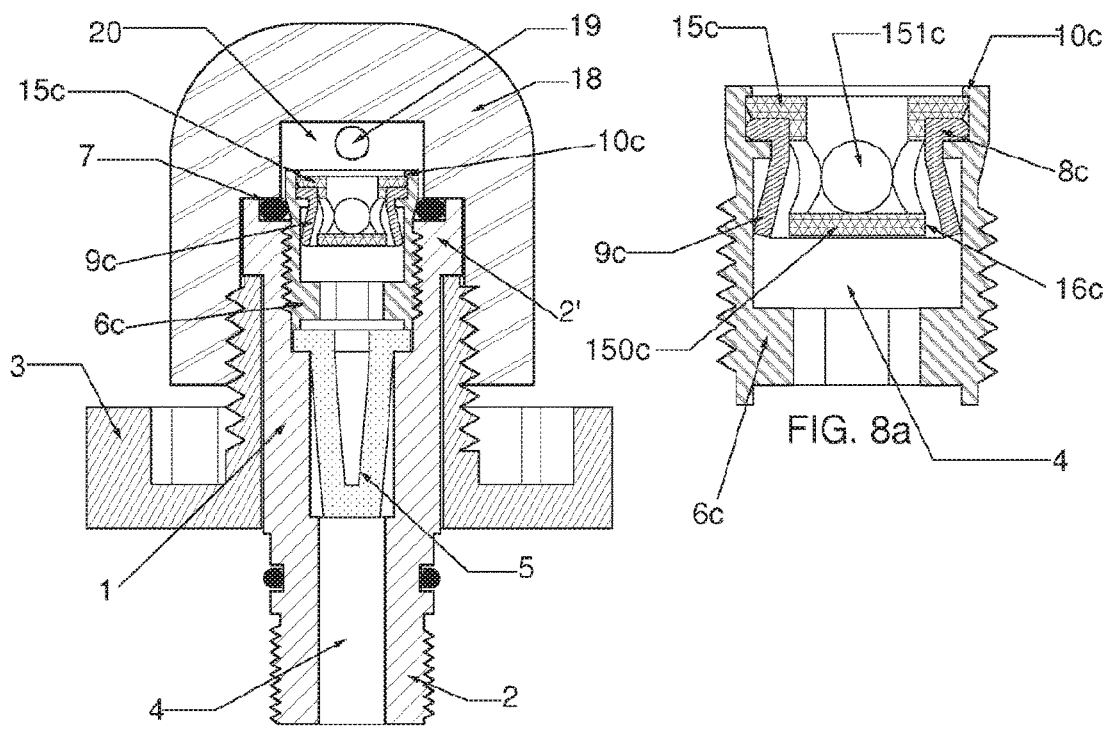
FIG. 8 is a view similar to the view of FIG. 7, in the open position.
FIG. 8a is a fragmentary detail view of the FIG. 8 device.
Figure 9:
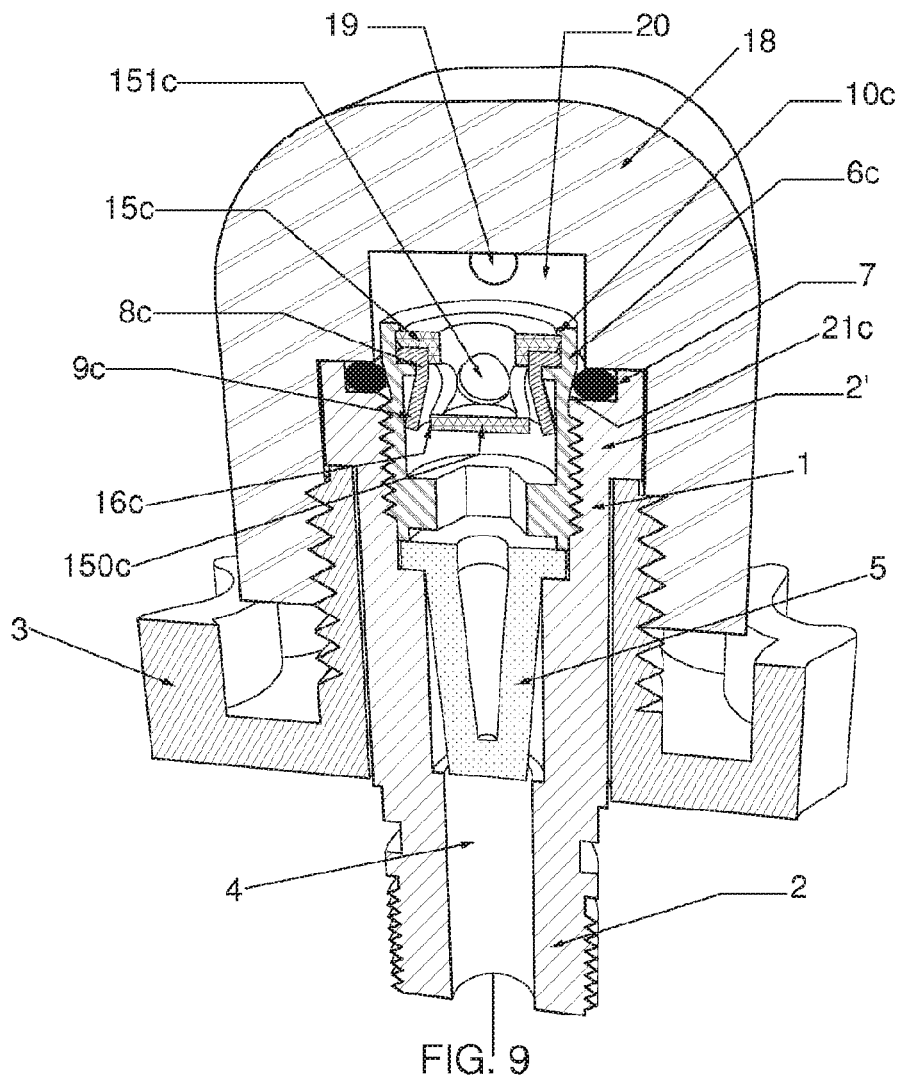
FIG. 9 is a diagrammatic cutaway perspective view of the FIG. 8 device.

FIGS. 7 to 9 show a third advantageous embodiment of the present invention. Only the differences compared with the above embodiments are described below.

In this third embodiment, a stationary shutter element 15c is held in the top portion of the retaining member 6c by a radial shoulder 10c thereof. The stationary shutter element 15c is axially open to said chamber 20 of the valve 18 and is axially closed to said internal passage 4 by an axial wall 150c. It includes lateral openings 151c allowing the stream of compressed air to pass from said valve 18 to said internal passage 4. These lateral openings 151c are closed, in the shut position, by said shutter member 9c, provided in this example in the form of a sleeve that is transversely or radially deformable in an outward direction. The deformable sleeve 9c is secured to a radial flange forming the stationary portion 8c, which is held securely between said retaining member 6c and said stationary shutter element 15c. The radially outer edge 16c of said axial wall 150c of the stationary shutter element 15c forms the surface for leaktight co-operation with said shutter member 9c.

As can be seen in FIGS. 8, 8a, and 9, when the compressed air stream comes into the chamber 20 of the valve 18, it penetrates into said stationary shutter element 15c via its top axial opening, and then passes through said lateral openings 151c in order to deform said shutter member 9c and thus lift it from said sealing co-operation surface 16c. This opens said inlet opening and enables the compressed air stream to pass. When the air stream stops, the shutter member 9c returns resiliently towards its closed position, reclosing said inlet opening and thus preventing non-pressurized water from entering into the internal passage 4.

Figures 10, 11:
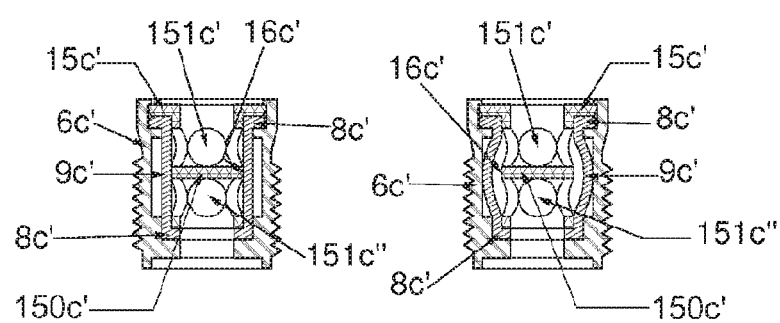
FIGS. 10 and 11 are diagrammatic fragmentary detail views of a shutter device in a variant embodiment of the present invention, respectively in the shut position and in the open position.

FIGS. 10 and 11 show an embodiment variant of the third embodiment of FIGS. 7 to 9. In this variant, the shutter member 9c' is held stationary between said retaining member 6c' and said stationary shutter member 15c' at both of its axial ends, thereby forming two stationary portions 8c', and the shutter member 9'c is arranged axially between these two stationary portions 8c'. The stationary shutter member 15c' includes first lateral openings 151c' and second lateral openings 151c" that are separated axially by a radial wall 150c'. The radially outer edge 16c' of said axial wall 150c' of the stationary shutter element 15c' forms the sealing surface co-operating with said shutter member 9c'. This variant makes it possible to provide a shutter device that operates in both directions.

FIGS. 12 to 13a show a fourth advantageous embodiment of the invention. Only the differences relative to the third embodiment are described below.

In this embodiment, based on the third embodiment, the shutter member 9d is formed by an O-ring. In this embodiment there is thus no stationary portion made integrally with the shutter member 9d. The shutter member 9d co-operates in leaktight manner in the shut position with the retaining member 6d, in particular with a recess provided with a radial surface 23d, and with a preferably conical surface 16d of the stationary shutter element 15d. FIGS. 13 and 13a show the O-ring 9d in the open position, deformed and shifted by compressed air, thereby opening the passage for air. In this embodiment, the stationary shutter element 15d is completely closed at its top axial wall. A radially outer edge of said top axial wall forms the sealing surface 16d for co-operating with said shutter member 9d. The compressed air stream, after it has opened the shutter member 9d, can penetrate into said internal passage 4 via lateral openings 151d in said stationary shutter element 15d.

FIGS. 14 to 15a show a fifth advantageous embodiment of the invention. Only the differences relative to the above embodiments are described below.

This embodiment uses as its shutter member the main O-ring 9e, which co-operates in leaktight manner in the closed position with a radial surface 22 of the connector 1 and with a preferably conical surface 16e of the retaining member 6e. FIGS. 15 and 15s show the O-ring 9e in the open position as deformed and shifted by compressed air, thereby opening the passage for air. In this embodiment, and unlike the above-described embodiments, the retaining member 6e is completely closed at its top axial wall 60e. A radially outer edge of said top axial wall 60e forms the sealing surface 16e for co-operating with said shutter member 9e. After opening the shutter member 9e, the compressed air stream can penetrate into said internal passage 4 via lateral openings 61e in said retaining member 6e. In this embodiment, there is no stationary shutter element, as in the above embodiments, and the shutter member 9e co-operates directly with said retaining member 6e.

The present invention thus makes it possible to provide a connection system that presents one or more of the following advantages, depending on the embodiment:

the shutter member is opened by compressed air, which is simple and reliable;

the system includes a shutter member and requires a genuine physical operation of opening said shutter member, thereby reinforcing the safety of the system;

the shutter member is arranged outside the internal passage 4, thereby improving air flow rate performance, by combining shutting outside the internal passage 4 with being opened by the compressed air stream;

the opening movement of the shutter member is directed radially or transversely in an outward direction and is thus substantially perpendicular to the compressed air stream, thus making it possible to place the shutter member outside the internal passage 4; and the shutter member is urged resiliently towards its shut position by being made of an elastically deformable material so that no external bias means such as a spring are required for urging the closure member towards its closed position; this simplifies the system and improves operating safety and/or the flow performance of the compressed air stream.

Although the present invention is described with reference to a plurality of advantageous embodiments thereof, it should be understood that a person skilled in the art can make any useful modification thereto without going beyond the ambit of the present invention as defined by the accompanying claims.

The invention claimed is:

1. A connection system, for a pressure reducer of a diving regulator, the system comprising a connector having a first end adapted to be fastened to a pressure reducer and a second end adapted to be fastened to a valve of a compressed air cylinder, said connector having an internal passage extending substantially axially between said first and second ends, said internal passage including a filter and a retaining member fastened to said second end and supporting firstly said filter and secondly a main O-ring, said retaining member forming an inlet opening, said system including a shutter device comprising a shutter member that is deformable and/or movable between a shut position in which it shuts said inlet opening, and an open position in which it does not shut said inlet opening, said shutter member being urged resiliently towards its shut position and being deformed and/or shifted towards its open position by compressed air coming from said compressed air cylinder, wherein said shutter member is deformed and/or shifted towards its open position in a direction extending substantially transversely relative to the flow direction of the compressed air stream.

2. A system according to claim 1, wherein said shutter member is made of an elastically deformable material such as an elastomer.

3. A system according to claim 1, wherein said shutter member, when in the open position, is arranged outside said internal passage so that it does not limit the flow of the compressed air stream.

4. A system according to claim 1, wherein said shutter member is arranged inside said retaining member.

5. A system according to claim 4, wherein said shutter member, when in the shut position, co-operates with a stationary shutter element fastened inside said retaining member.

6. A system according to claim 5, wherein said stationary shutter element does not extend axially towards the inside of said internal passage beyond said shutter member.

7. A system according to claim 5, wherein said shutter element extends axially towards the inside of said internal passage beyond said shutter member.

8. A system according to claim 4, wherein said shutter member includes a stationary portion that is stationary relative to said retaining member.

9. A system according to claim 1, wherein said shutter member is arranged outside said retaining member.

10. A system according to claim 9, wherein said shutter member forms said main O-ring of said system.

11. A system according to claim 9, wherein, said shutter member, in the shut position, co-operates directly with said retaining member.

12. A system according to claim 1, wherein said connector includes a threaded ring for fastening said second end to a threaded outlet from said valve of the compressed air cylinder.

13. A system according to claim 1, wherein said connector includes a clamp system for fastening said second end to a non-threaded outlet of said valve of the compressed air cylinder.

14. A pressure reducer, comprising a connection system according to claim 1.

15. A compressed air cylinder valve, comprising a connection system according to claim 1.

16. A diving regulator, comprising a pressure reducer or a compressed air cylinder valve comprising a connection system according to claim 1 or a valve.

17. The system according to claim 1, wherein in the filter is made of sintered stainless steel.

* * * * *